United States Patent
Asayag et al.

(10) Patent No.: US 10,200,239 B2
(45) Date of Patent: Feb. 5, 2019

(54) NORMALIZED MANAGEMENT NETWORK

(71) Applicant: Red Hat Israel, Ltd., Raanana (IL)

(72) Inventors: Mordechay Asayag, Netanya (IL); Dan Kenigsberg, Dublin (IE)

(73) Assignee: Red Hat Israel, Ltd., Raanana (IL)

(*) Notice: Subject to any disclaimer, the term of this patent is extended or adjusted under 35 U.S.C. 154(b) by 67 days.

(21) Appl. No.: 14/188,205

(22) Filed: Feb. 24, 2014

(65) Prior Publication Data
US 2015/0188778 A1 Jul. 2, 2015

Related U.S. Application Data

(60) Provisional application No. 61/921,398, filed on Dec. 27, 2013.

(51) Int. Cl.
*H04L 12/24* (2006.01)

(52) U.S. Cl.
CPC ...... *H04L 41/0806* (2013.01); *H04L 41/5041* (2013.01)

(58) Field of Classification Search
CPC .............................. H04L 12/26; H04L 12/24
USPC ....................................................... 709/224
See application file for complete search history.

(56) References Cited

U.S. PATENT DOCUMENTS

| | | | | |
|---|---|---|---|---|
| 5,570,366 A * | 10/1996 | Baker | ........................... | 370/312 |
| 7,802,000 B1 * | 9/2010 | Huang | ................... | G06F 9/5077 455/404.2 |
| 9,112,769 B1 * | 8/2015 | Fitzgerald | ........... | H04L 41/0213 |
| 9,575,798 B2 * | 2/2017 | Terayama | ........... | H04L 12/4641 |
| 2008/0244595 A1 * | 10/2008 | Eilam | ....................... | G06F 8/10 718/104 |
| 2010/0100611 A1 * | 4/2010 | Hatasaki | .................. | G06F 13/00 709/221 |
| 2010/0153554 A1 * | 6/2010 | Anschutz | ....................... | 709/226 |
| 2011/0022812 A1 * | 1/2011 | van der Linden | .... | G06F 9/5077 711/163 |
| 2011/0055364 A1 * | 3/2011 | Heim | ................... | H04L 41/0806 709/223 |
| 2011/0055824 A1 * | 3/2011 | Benari | ..................... | G06F 9/455 717/176 |
| 2012/0096473 A1 * | 4/2012 | Durham | ................ | G06F 9/5077 718/105 |
| 2013/0275568 A1 * | 10/2013 | Nguyen | .............. | H04L 41/5025 709/223 |
| 2013/0283263 A1 * | 10/2013 | Elemary | ............. | G06F 9/45558 718/1 |
| 2014/0052864 A1 * | 2/2014 | Van Der Linden | ... | G06F 9/5077 709/226 |
| 2014/0052877 A1 * | 2/2014 | Mao | ...................... | H04L 61/103 709/245 |
| 2014/0126561 A1 * | 5/2014 | Meier | ................. | H04L 12/4641 370/338 |
| 2014/0241144 A1 * | 8/2014 | Kashyap | ............... | H04L 47/365 370/216 |

(Continued)

*Primary Examiner* — Moustafa M Meky
*Assistant Examiner* — Elizabeth Kassa
(74) *Attorney, Agent, or Firm* — Womble Bond Dickinson (US) LLP; Daniel E. Ovanezian

(57) ABSTRACT

An apparatus obtains one or more management logical network properties. The apparatus determines one or more management logical network properties to be instantiated. The apparatus performs, in accordance with the determined properties, management logical network configuration.

17 Claims, 5 Drawing Sheets

(56) References Cited

U.S. PATENT DOCUMENTS

| | | | |
|---|---|---|---|
| 2015/0071110 A1* | 3/2015 | Kothari | H04L 41/0663 370/254 |
| 2015/0103839 A1* | 4/2015 | Chandrashekhar | H04L 45/741 370/401 |
| 2015/0103843 A1* | 4/2015 | Chandrashekhar | H04L 45/741 370/409 |
| 2015/0106804 A1* | 4/2015 | Chandrashekhar | H04L 45/741 718/1 |

* cited by examiner

NORMALIZED MANAGEMENT NETWORK

CROSS-REFERENCE TO RELATED APPLICATION

This application claims the benefit of U.S. Provisional Application No. 61/921,398 filed Dec. 27, 2013, which is incorporated herein by reference in its entirety.

TECHNICAL FIELD

This disclosure relates to the field of virtualization and, in particular, to creation of a management logical network with respect to a virtual machine hosting server.

BACKGROUND

Logical networks can be employed, for instance, in connection with devices to separate the communications thereof into use-based groupings. The raw IPv4, IPv6, and/or other connectivity enjoyed by a virtual machine (VM) hosting server could, say, be employed for all three of management of the VM hosting server, with regard to virtual machines hosted by the VM hosting server, and/or to provide storage connectivity to the VM hosting server. However, establishing logical networks for one or more of these functions can potentially facilitate various operations. For instance, establishing a logical network for the storage needs of the VM hosting server might allow for various actions to more easily be constrained to the storage access domain.

A management logical network created during deployment of, say, a VM hosting server may not be created in an ideal way. For example, a management logical network so created might be a bridged logical network even where a non-bridged logical network is called for (e.g., according to a data center definition) and/or may be created with an incorrect Maximum Transmission Unit (MTU) size. As such, the resultant management logical network might need to be replaced or modified later. Moreover, such creation during deployment of a management logical network may place additional burdens upon deployment functionality. For instance, additional scripts and/or additional connectivity might be called for. As example, host agent-to-manager connectivity might be required so that the device of the VM hosting server upon which the management logical network is to be established can be ascertained (e.g., via ping).

BRIEF DESCRIPTION OF THE DRAWINGS

The present disclosure is illustrated by way of example, and not by way of limitation, in the figures of the accompanying drawings.

DETAILED DESCRIPTION

The employ of a management logical network—as opposed to, say, raw IPv4 and/or IPv6 connectivity—allows, for instance, for communications between a manager of a host controller and a host agent of a VM hosting server to be compartmentalized from various other communications sent over a network connecting such a host controller and such a VM hosting server.

However, such a management logical network is typically initially established according to default properties (e.g., as specified by one or more configuration scripts) rather than according to desired properties. As such, the management logical network, as initially established, may possess other than desired properties with respect to, for example, MTU size and/or type (e.g., bridged versus non-bridged). Accordingly, the initially-established management logical network may need to have one or more of its properties altered, or the management logical network may need to be replaced.

Set forth herein are examples of approaches by which a management logical network can, for instance, be initially established in a fashion consistent with desired properties. Via a reply to a dispatched probe and/or via database access, information regarding a desired management logical network may be obtained. A management logical network in agreement with those determined properties may then be configured. As such, for instance, avoided may be call to alter or replace an initially-established management logical network due to its lacking desired properties.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example-only details and still be contemplated to be within the scope of the present invention.

Figure 1:
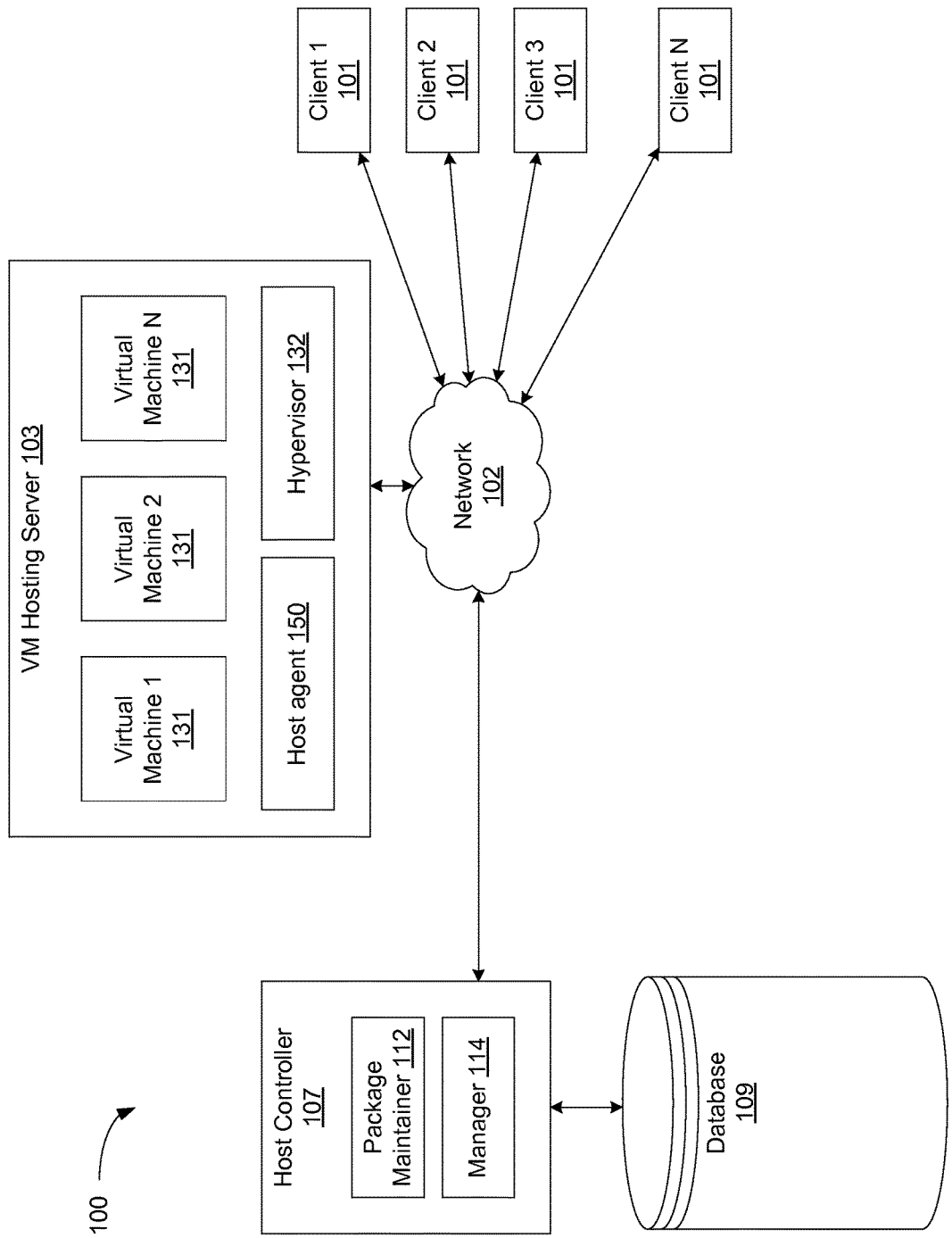
FIG. 1 illustrates an example network architecture in which examples of the present invention may operate.

FIG. 1 illustrates an example network architecture 100 in which examples of the present invention may operate. The network architecture 100 includes one or more VM hosting servers 103 coupled to clients 101 over a network 102. The network 102 may be a private network (e.g., a local area network (LAN), wide area network (WAN), intranet, etc.) or a public network (e.g., the Internet). The VM hosting servers 103 may also be coupled to a host controller 107 (via the same or a different network or directly). Host controller 107 may be an independent machine such as a server computer, a desktop computer, etc. Alternatively, the host controller 107 may be part of the VM hosting server 103. In one example, the network architecture 100, including host controller 107, VM hosting servers 103 and clients 101, may be referred to as a virtualization environment.

In one example, the clients 101 may include computing devices that have a wide range of processing capabilities. Some or all of the clients 101 may be thin clients, which serve as access terminals for users and depend primarily on the VM hosting servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the VM hosting server 103 and re-direct the received data to a local display or other user interface.

VM hosting servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The VM hosting server 103 may include a hypervisor 132 that emulates the underlying hardware platform for the virtual machines 131. The hypervisor 132 may also be known as a virtual machine monitor (VMM) or a kernel-based hypervisor. The VM hosting server may include a host agent 150. As is discussed in greater detail hereinbelow, host agent 150 may perform operations including preparing a probe response to a received probe (e.g., a probe received from manager 114) and/or implementing networking changes (e.g., in response to a directive received from manager 114).

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks. These virtual disks can be logical partitions of a physical disk managed by hypervisor 132, can be cloud based storage devices, or can be some other type of virtual storage device. In one example, virtual disks may form a whole or part of a logical data center. In one example, virtual machines 131 and virtual disks, together with host servers 103, may be collectively referred to as entities in a virtual machine system.

The virtual machines 131 and virtual disks are managed by the host controller 107. Host controller 107 may manage the allocation of resources from host server 103 to virtual machines 131. In addition, host controller may monitor the status of virtual machines 131 as well as the progress of commands and processes being executed by virtual machines 131 and/or on virtual machines 131. The host controller 107 may include a manager 114 to perform management operations in the virtualization system, including for example allocating resources of host servers 103 to virtual machines 131, monitoring the status of virtual machines 131, monitoring the progress of commands and processes being executed by virtual machines 131, etc. As discussed in greater detail hereinbelow, manager 114 may perform operations including gaining information regarding a management logical network to be configured and/or causing VM hosting server logical management network access.

The host controller 107 may also maintain a management database 109 used by the manager 114 for the above management operations. As is discussed in greater detail hereinbelow, management database 109 may include, for instance, VM hosting server networking configuration information and/or management logical network configuration information.

In one example, host controller 107 also includes a package maintainer 112 to install, upgrade, or configure software packages on the host controller 107 in a consistent manner. For example, the package maintainer 112 may be used to install or upgrade the manager 114 on the host controller 107.

Figure 2:
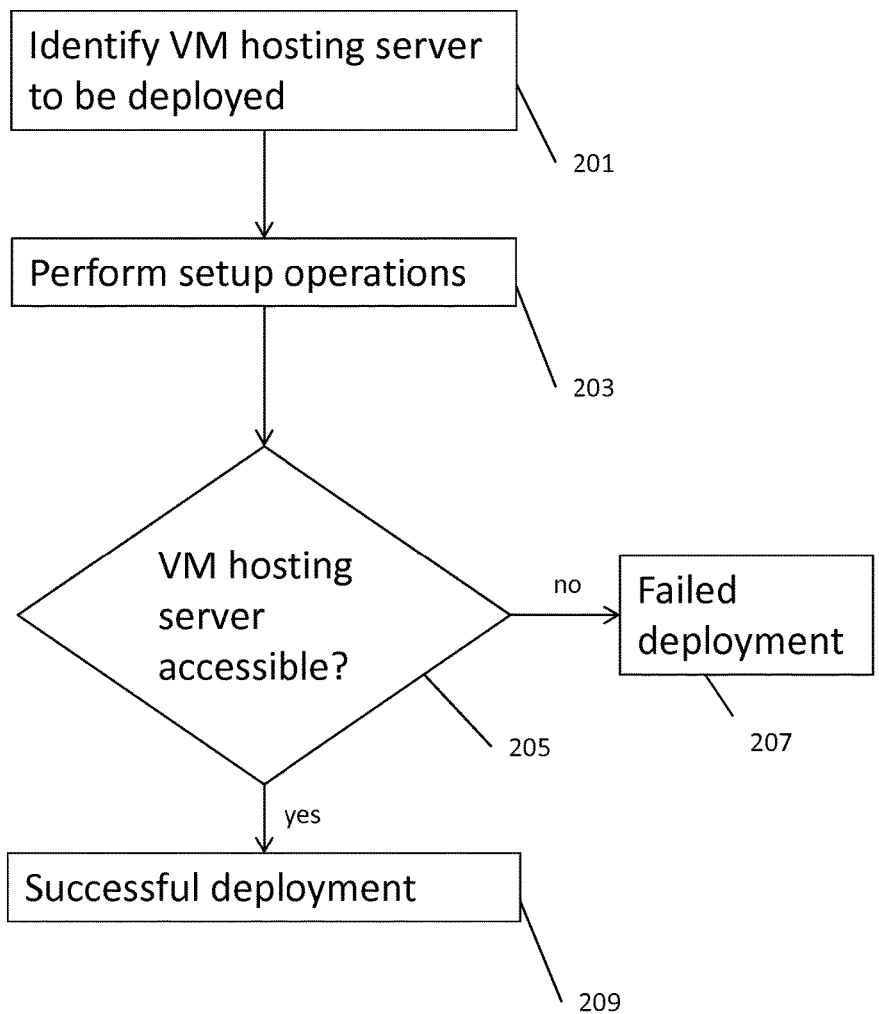
FIG. 2 is a flow diagram illustrating a method of virtual machine hosting server deployment, according to an example.

FIG. 2 illustrates a flow diagram of one example of a method of deploying a VM hosting server (e.g., VM hosting server 103). The method may be performed by processing logic that comprises hardware (e.g., circuitry, dedicated logic, programmable logic, microcode, etc.), software (such as instructions run on a processing device), or a combination thereof. As one example, the method may be performed by a manager running on a computing device. For instance, the method may be performed by manager 114 running on host controller 107.

Referring to FIG. 2, at block 201 the processing logic identifies a VM hosting server (e.g., VM hosting server 103) which is to be deployed (e.g., be the target of one or more setup operations). The VM hosting server to be deployed may, for instance, be a VM hosting server connected (e.g., for the first time) to network 102 or an existing VM hosting server which had been previously deployed but which is to be deployed again (e.g., to address a malfunction of the VM hosting server). As one example, the processing logic is made aware of the presence of the VM hosting server to be deployed due to receiving indication of such from a user (e.g., via a GUI). As another example, the processing logic becomes aware of the presence of the VM hosting server to be deployed without receiving a user indication thereof (e.g., the processing logic may become aware of the presence of the VM hosting server to be deployed via employment of a discovery technique—for instance domain name service—service discovery (DNS-SD) and/or simple service discovery protocol (SSDP).

Having identified the VM hosting server which is to be deployed, at block 203 the processing logic may perform one or more setup operations with respect to that VM hosting server. For example, the processing logic may instruct the VM hosting server to install and/or download (e.g., from a specified server) indicated functionality (e.g., to download and/or install host agent 150), to perform specified network operations (e.g., to adopt one or more network addresses with respect to one or more network interface cards (NICs) of the VM hosting server, to connect to one or more network gateways, and/or to perform one or more firewall configurations), and/or to perform one or more security and/or access operations (e.g., to establish one or more accounts employable in accessing the VM hosting server). The setup operations might, for instance, be performed by way of the processing logic providing the VM hosting server with one or more scripts to be executed. The processing logic might send, to the VM hosting server to be deployed, the scripts via file transfer (e.g., via file transfer protocol (FTP), hypertext transfer protocol (HTTP), and/or via network file system (NFS)). The setup operations might, for instance, be performed by way of the processing logic communicating with the VM hosting server via interprocess communication (e.g., via Simple Object Access Protocol (SOAP) or eXtensible Markup Language-Remote Procedure Call (XML-RPC)).

In connection with performing the setup operations the processing logic might, for example, instruct the VM hosting server not to perform a reboot after completion of the setup operations (e.g., the VM hosting server might operate such that it reboots after the completion of setup unless instructed to not reboot). As another example, the processing logic may not instruct the VM hosting server to not reboot.

Further in connection with performing the setup operations, the processing logic might, for example, instruct the VM hosting server to not configure a management logical network with respect to itself (e.g., the VM hosting server might operate such that it configures a management logical network having default properties—for example as specified by one or more configuration scripts—unless instructed to not configure such management logical network).

At block 205 the processing logic may, having completed the setup operations, attempt to access the VM hosting server. The processing logic might consider the ability to access the VM hosting server subsequent to the completion of the setup operations as indication that the setup operations and/or deployment had completed successfully, and/or might consider the inability to access the VM hosting server subsequent to completion of the setup operations as indication that the setup operations and/or deployment had not completed successfully. The processing logic might attempt to access the VM hosting server via interprocess communication, via one or more networking facilities (e.g., via ping), and/or via an interprocess communication request and/or other request dispatched to the VM hosting server asking that it provide information regarding its networking configuration. The processing logic might attempt the access one or more times and/or wait a certain amount of time (e.g., as established during a configuration operation) before considering the VM hosting server to be non-responsive.

Where the processing logic comes to consider the VM hosting server access attempt to be unsuccessful (e.g., where the VM hosting server is not accessible via the access attempt, does not reply to the access attempt, and/or is neither accessible nor responsive within a certain configured amount of time), the processing logic may at block 207 consider deployment to have failed. The processing logic might inform a user of the failure (e.g., via a GUI) and/or log an error (e.g., to a console).

Where the processing logic comes to consider the VM hosting server access attempt to be successful (e.g., where the VM hosting server is accessible via the access attempt, does reply to the access attempt, and/or is either accessible and/or responsive within a certain configured amount of time), the processing logic may at block 209 consider deployment to have competed successfully.

It is noted that the deployment discussed in connection with FIG. 3 might, for instance, be initiated by a host controller. It is noted that the deployment discussed in connection with FIG. 3 might, for instance, be initiated by a VM hosting server.

Figure 3:
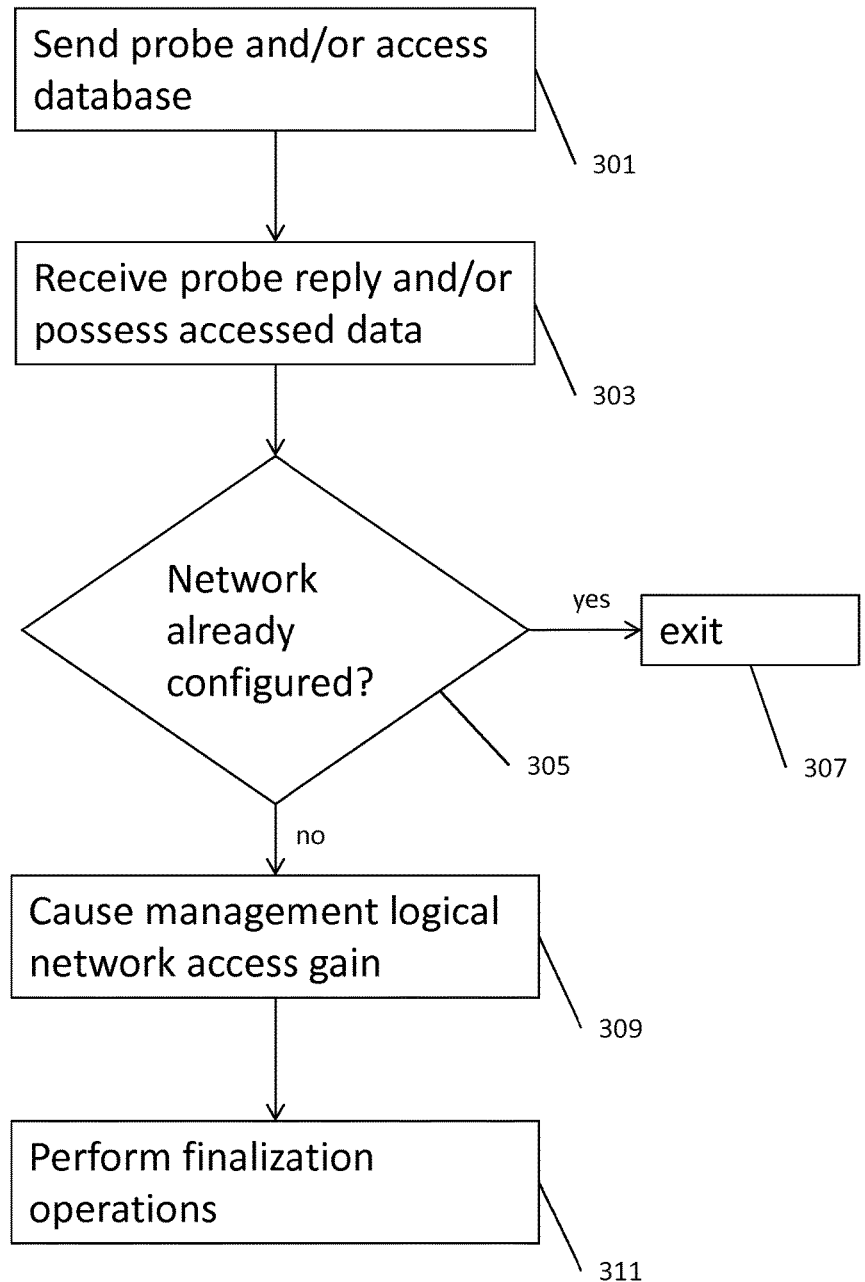
FIG. 3 is a flow diagram illustrating a method of management logical network configuration, according to an example.

FIG. 3 illustrates a flow diagram of one example of a method of configuring a management logical network of a VM hosting server (e.g., VM hosting server 103). The method may be performed by processing logic that comprises hardware (e.g., circuitry, dedicated logic, programmable logic, microcode, etc.), software (such as instructions run on a processing device), or a combination thereof. As one example, the method may be performed by a manager running on a computing device. For instance, the method may be performed by manager 114 running on host controller 107. The VM hosting server with respect to which the operations of FIG. 3 are performed may, for instance, have been subject to deployment (e.g., deployment in accordance with that which is discussed in connection with FIG. 2). The VM hosting server with respect to which the operations of FIG. 3 are performed may, for instance, not have been subject to deployment.

Referring to FIG. 3, at block 301, the processing logic may send a probe to host agent 150 and/or may access database 109. The processing logic may for instance (e.g., where VM hosting server 103 has been subject to deployment in accordance with that which is discussed in connection with FIG. 2) await post-deployment responsiveness of host agent 150 prior to the performance of that which is discussed in connection with block 301. The processing logic may for instance (e.g., where VM hosting server 103 has not been subject to deployment in accordance with that which is discussed in connection with FIG. 2) not await such post-deployment responsiveness. At block 303 the processing logic may receive a reply to the sent probe and/or may be in possession of data retrieved via the access. Via the probe reply and/or the data retrieved from database 109, the processing logic may have at its disposal information regarding the networking configuration of VM hosting server 103, and/or information regarding the management logical network which is to be configured.

The probe reply may provide some, all, or none of the information regarding the networking configuration of VM hosting server 103, and some, all, or none of the information regarding the management logical network which is to be configured. Alternately or additionally, the database access may provide some, all, or none of the information regarding the networking configuration of VM hosting server 103, and some, all, or none the information regarding the management logical network which is to be configured.

As one example, the information regarding the networking configuration of VM hosting server 103 may be received via the probe reply and the information regarding the management logical network which is to be configured may be received via the database access. As another example, both of the information regarding the networking configuration of VM hosting server 103 and the information regarding the management logical network which is to be configured may be received via the probe reply. As a further example both of the information regarding the networking configuration of VM hosting server 103 and the information regarding the management logical network which is to be configured may be received via the database access. As yet another example, the information regarding the networking configuration of VM hosting server 103 may be received via the database access and the information regarding the management logical network which is to be configured may be received via the probe reply.

The information regarding the management logical network which is to be configured may come to be possessed by the database and/or by VM hosting server 103 (e.g., where VM hosting server 103 acts to provide such information via the probe reply) by way of a user providing indication of such (e.g., via GUI), and/or by way of the database (e.g., via the action of host controller 107 and/or manager 114)—and/or VM hosting server 103—accessing such information via a storage location (e.g., a storage location of a server accessible via network 105).

Alternately or additionally, the database may come to possess (e.g., via the action of host controller 107 and/or manager 114) the information regarding the networking configuration of VM hosting server 103, of other VM hosting servers, and/or other devices. For example, devices accessible via network 105 may provide (e.g., periodically, in response to a networking change, and/or in response to a request such as a request from database 109, host controller 107, and/or manager 114) their networking configuration information to database 109, host controller 107, and/or manager 114.

The information regarding the management logical network which is to be configured may include virtual local area network (VLAN) identifier, maximum transmission unit (MTU) size, type (e.g., bridged or non-bridged), spanning tree protocol (STP) status (e.g., enabled, disabled, or not applicable), classification (e.g., VM network, storage network, and/or management network), and/or name. The name may for instance be user-chosen, user-readable, formulated using one or more characters (e.g., American standard code for information interchange (ASCII) and/or Unicode characters), and/or a name which is indicative of a management logical network (e.g., according to an implementation definition).

The information regarding the networking configuration of VM hosting server 103 may concern one or more network interfaces of VM hosting server 103. The information may include network interface type (e.g., network interface card (NIC), bond, and/or VLAN), network interface identifier (e.g., ethn for a NIC or bondn for a bond where n is an integer), network interface composition (e.g., an indication of the composition of a bond—for instance indication that a bond bond4 is made up of NICs eth2 and eth3), VLAN ID of a VLAN with which one or more network interfaces of VM hosting server 103 are associated, type (e.g., bridged or non-bridged) of the VLAN with which the one or more network interfaces of VM hosting server 103 are associated, STP status (e.g., enabled, disabled, or not applicable) of the VLAN with which the one or more network interfaces of VM hosting server 103 are associated, name (e.g., user-chosen, user-readable, and/or formulated using one or more characters as discussed above) of the VLAN with which the one or more network interfaces of VM hosting server 103 are associated, classification of the VLAN with which the one or more network interfaces of VM hosting server 103 are associated, indication (e.g., a flag) of whether or not management logical network has been configured with respect to VM hosting server 103, network interface internet protocol (IP) address, network interface protocol employ (e.g., dynamic host configuration protocol (DHCP)), network interface MTU, and/or network interface gateway employ gateway (e.g., designated as an IP address).

Among the one or more network interfaces of VM hosting server 103 may be one or more network interfaces which are to be employed for the management logical network. The one or more VM hosting server network interfaces to be employed for the management logical network may be one or more network interfaces of VM hosting server 103 which were employed in communications between VM hosting server 103, and the processing logic and/or manager 114 during a deployment of VM hosting server 103 (e.g., a deployment performed in accordance with that which is discussed hereinabove with respect to FIG. 2), one or more network interfaces of VM hosting server 103 which were used to receive the probe, and/or one or more other interfaces of VM hosting server 103.

As an example, the processing logic may consider the VLAN ID of the management logical network which is to be configured to be as specified by the above-discussed received information regarding the management logical network which is to be configured. As another example, the processing logic may consider the VLAN ID of the management logical network which is to be configured to instead be a VLAN ID included in information regarding the networking configuration of VM hosting server 103. Such employ of information regarding the networking configuration of VM hosting server 103 for electing the VLAN ID of the management logical network which is to be configured may involve a VLAN ID associated with that VM hosting server dictating the VLAN ID to be employed for the management logical network. A VM hosting server so acting to set the VLAN ID to be employed with respect to the management logical network might be the first VM hosting server for which the processing logic acts to perform management logical network configuration (e.g., a first VM hosting server added to a data center with which the processing logic is associated), and/or a particular specified VM hosting server. Such a particular specified VM hosting server might, for instance, be a VM hosting server identified by a user (e.g., via a GUI) as being the VM hosting server whose associated VLAN ID is to be employed as the VLAN ID of the management logical network, and/or a VM hosting server identified in a storage location (e.g., database 109)—and/or in the received networking configuration—as being the VM hosting server whose associated VLAN ID is to be employed as the VLAN ID of the management logical network.

At block 305 the processing logic may determine whether or not the management logical network has, in a manner compliant with the possessed information regarding the management logical network, already been configured with respect to VM hosting server 103. As one example, where the information regarding the network configuration of VM hosting server 103 includes indication as to whether or not management logical network has been configured with respect to the VM hosting server (e.g., a flag), where the indication specifies that management logical network has been configured, the processing logic may consider the management logical network to already be configured for VM hosting server 103 in a compliant fashion.

As another example, where the information regarding the network configuration of VM hosting server 103 includes VLAN ID, MTU size, VLAN type, VLAN STP status, VLAN classification, and/or VLAN name, these may be compared with the corresponding possessed information regarding the VLAN ID, MTU size, VLAN type, VLAN STP status, VLAN classification, and/or VLAN name of the management logical network which is to be configured, with the processing logic considering the management logical network to already be configured in a compliant fashion in the case where some or all of the information matches. For instance, the management logical network might be considered to already be established in a compliant fashion in the case where all of the information matches. For instance, the management logical network might be considered to already be established in a compliant fashion in the case where a certain percentage or quantity of the data items match. For instance, the management logical network might be considered to already be established in a compliant fashion in the case where certain particular data items match (e.g., where VLAN ID and MTU match, where VLAN ID and VLAN type match, where VLAN ID, VLAN type, and MTU match, or where VLAN ID matches). As a further example, the processing logic may perform both indication check in the vein of that discussed and information match determination in the vein of that discussed, with the processing logic considering the management logical network to already be established with respect to VM hosting server 103 in the case where both the indication check and the information match determination yield affirmative results (e.g., where the indication specifies that management logical network has been configured, and the VLAN ID and MTU also match).

Where the processing logic comes to consider the management logical network to already be, in a compliant fashion, configured with respect to VM hosting server 103, the processing logic may exit the flow of FIG. 3 at block 307. Where the processing logic does not come to consider the management logical network to already be configured with respect to VM hosting server 103, the processing logic may proceed to block 309.

Being in possession of the information regarding the networking configuration of VM hosting server 103 and/or the information regarding the management logical network which is to be configured—and having determined that it is not the case that the management logical network has already and in a compliant manner already been configured with respect to VM hosting server 103—the processing logic may, at block 309, act so as to cause VM hosting server 103 to gain access to the logical management network. As such, the processing logic may determine one or more management logical network properties to be instantiated, and then perform management logical network configuration in agreement with those determined properties.

As one example, suppose that the information regarding the networking configuration of VM hosting server 103 includes indication that the network interface to be employed for the management logical network is of type NIC, that the network interface has the network interface identifier eth0, that the network interface has an MTU of 5000, and that no VLAN is presently associated with the network interface. The indication that no VLAN is presently associated with the network interface may, for instance, be by way of the information regarding the networking configuration of VM hosting server 103 not specifying a type of VLAN for the network interface, and/or by the information regarding the networking configuration of VM hosting server 103 not specifying a VLAN ID. Further according to the example suppose that the information regarding the management logical network which is to be configured includes a VLAN ID of 300, a MTU of 6000, a type indication of bridged, an STP status of enabled, a classification of management network and VM network, and a name of "vm-mana."

Additionally according to the example, the processing logic may act to change the MTU of NIC eth0 of VM hosting server 103 from 5000 to 6000, and further to associate eth0 of VM hosting server 103 with a VLAN having a VLAN ID 300, being of type bridged, having an STP status of enabled, being both of classification management network and of classification VM network, and having a name "vm-mana." The association of eth0 with VLAN ID 300 may cause VM hosting server 103 to consider incoming and/or outgoing transmissions associated with (e.g., tagged according to) VLAN ID 300 to be transmissions of the management logical network. Where the information regarding the networking configuration of VM hosting server 103 includes an indication of whether or not management logical network has been configured with respect to VM hosting server 103, the processing logic may set that indication to specify that such configuration has transpired.

As another example, suppose that the information regarding the networking configuration of VM hosting server 103 includes indication that the network interface to be employed for the management logical network is of type bond, that the network interface has the network interface identifier bond1, that bond1 is composed of a NIC having the identifier eth0 and a NIC having the identifier eth1, that the network interface has a MTU of 9000, and that no VLAN is presently associated with the network interface (e.g., with the lack of present VLAN association being indicated as discussed above). Further according to the example, suppose that the information regarding the logical network which is to be configured includes a VLAN ID of 800, a MTU of 9000, a type indication of non-bridged, an STP status of not applicable, and a classification of management network and a name of "ovirtmgmt."

Additionally according to the example, the processing logic may, in view of bond1 already having its MTU as the called-for 800, not change the MTU of bond1, and further act to associate bond1 with a VLAN having a VLAN ID 800, being of type non-bridged, being of classification management network, and having a name "ovirtmgmt." The association of bond1 with VLAN ID 800 may cause VM hosting server 103 to consider incoming and/or outgoing transmissions associated with (e.g., tagged according to) VLAN ID 800 to be transmissions of the management logical network. Where the information regarding the networking configuration of VM hosting server 103 includes an indication of whether or not management logical network has been configured with respect to VM hosting server 103, the processing logic may set that indication to specify that such configuration has transpired.

There may or may not be specification of a particular VLAN ID which is to be employed for the management logical network. Moreover, where a network interface of VM hosting server 103 to be employed for the management logical network involves a VLAN, there may or may not be specification of a particular, corresponding VLAN ID. Where such comes to pass, the VLAN ID which is to be employed for the management logical network may or may not match the VM hosting server VLAN ID.

There may or may not be specification of a particular VLAN type (e.g., bridged or non-bridged) which is to be employed for the management logical network. Moreover, where a network interface of VM hosting server 103 to be employed for the management logical network involves a VLAN, there may or may not be specification of a particular, corresponding VLAN type (e.g., bridged or non-bridged). Where such comes to pass, the VLAN type which is to be employed for the management logical network may or may not match the VM hosting server VLAN type.

Where the VLAN IDs match, the processing logic may not take further action with regard to the VM hosting server VLAN ID. Where the VLAN types match, the processing logic may not take further action with regard to the VM hosting server VLAN type.

Where the VLAN IDs do not match, as one example a bridge (e.g., a virtual bridge) might be established to join the existing VLAN of VM hosting server 103 to the logical management network. As another example where the VLAN IDs do not match, the VLAN ID of the existing VLAN of VM hosting server 103 may be changed to the VLAN ID which is to be employed for the management logical network. As a further example where the VLAN IDs do not match, an error condition may be considered (e.g., by the processing logic) to have arisen and VM hosting server 103 might not gain access to the logical management network. The processing logic might make a user aware of the error (e.g., via a GUI).

Where the VLAN types do not match, as one example the VLAN type of the existing VLAN of VM hosting server 103 may be changed to the VLAN type which is to be employed for the management logical network. As a further example where the VLAN types do not match, an error condition may be considered (e.g., by the processing logic) to have arisen and VM hosting server 103 might not gain access to the logical management network. The processing logic might make a user aware of the error (e.g., via a GUI).

Where the VLAN IDs match, or where VLAN ID mismatch has been addressed (e.g., by VLAN ID change or bridging), and where the VLAN types match or where VLAN type mismatch has been addressed (e.g., by VLAN type change), the existing VLAN of VM hosting server 103 may be employed by VM hosting server 103 as the management logical network.

As an example, suppose that the information regarding the networking configuration of VM hosting server 103 includes indication that the network interface to be employed for the management logical network is both of type NIC and of type VLAN, that the network interface has the network interface identifier eth5.200, that the network interface has an MTU of 7000, that the network interface is associated with a VLAN of VLAN ID 200, that such associated VLAN is of type non-bridged, and that the STP status for such associated VLAN is not applicable. Further according to the example, suppose that the information regarding the management logical network which is to be configured includes a VLAN ID of 105, a MTU of 7000, a type indication of bridged, an STP status of enabled, a classification of management network, and a name of "man0."

Additionally according to the example, the processing logic may in view of eth5.200 already having its MTU as the called for 7000 not change the MTU of eth5.200. The processing logic may further change the type of the existing VM hosting server VLAN from non-bridged to bridged, set STP status as enabled, change the VLAN ID of the existing VM hosting server VLAN from 200 to 105, set the classification of the existing VM hosting server VLAN to management network, set the name of the existing VM hosting VLAN to "man0," and set the VM hosting server to employ its existing VLAN as the management logical network. It is noted that in the case where the existing VM hosting server VLAN has a class designation, class designation setting might overwrite that preexisting class. Moreover, in the case where the existing VM hosting server VLAN has a name, name setting might overwrite that preexisting name. Such setting of the VM hosting server to employ its existing VLAN as the management logical network may cause VM hosting server 103 to consider incoming and/or outgoing transmissions associated with (e.g., tagged according to) VLAN ID 105 to be transmissions of the management logical network. Where the information regarding the networking configuration of VM hosting server 103 includes an indication of whether or not management logical network has been configured with respect to VM hosting server 103, the processing logic may set that indication to specify that such configuration has transpired.

As another example, suppose that the information regarding the networking configuration of VM hosting server 103 includes indication that the network interface to be employed for the management logical network is both of type bond and of type VLAN, that the network interface has the network interface identifier bond2.335, that bond2 is composed of a NIC having the identifier eth1 and a NIC having the identifier eth3, that the network interface has an MTU of 7000, that the network interface is associated with a VLAN of VLAN ID 335, that such associated VLAN is of type non-bridged, and that the STP status for such associated VLAN is not applicable. Further according to the example, suppose that the information regarding the management logical network which is to be configured includes a VLAN ID of 335, a MTU of 8000, a type indication of non-bridged—an STP status of not applicable, a classification of both management network and storage network, and a name of "stor-mana."

Additionally according to the example, the processing logic may change the MTU of eth5.200 of VM hosting server 103 from 9300 to 8000, in view of the existing VLAN of the VM hosting server already having the called for type of non-bridged not change the type, in view of the existing VLAN of the VM hosting server already having the called for STP status of not applicable not change the STP status, in view of the existing VLAN of the VM hosting server already having the called for VLAN ID of 335 not change the VLAN ID, set the classification of the of the existing VM hosting server VLAN to be both management network and storage network, set the name of the existing VM hosting server VLAN to "stor-mana," and set the VM hosting server to employ its existing VLAN as the management logical network. It is noted that in the case where the existing VM hosting server VLAN has a class designation, class designation setting might overwrite that preexisting class. Moreover, in the case where the existing VM hosting server VLAN has a name, name setting might overwrite that preexisting name. Such setting of the VM hosting server to employ its existing VLAN as the management logical network may cause VM hosting server 103 to consider incoming and/or outgoing transmissions associated with (e.g., tagged according to) VLAN ID 335 to be transmission of the management logical network. Where the information regarding the networking configuration of VM hosting server 103 includes an indication of whether or not management logical network has been configured with respect to VM hosting server 103, the processing logic may set that indication to specify that such configuration has transpired.

At block 311 the processing logic may perform one or more finalization operations, For instance, the processing logic may determine whether or not VM hosting server 103 and/or host agent 150 thereof are accessible via the configured management logical network. The processing logic may consider the configuration of the management logical network to have not completed successfully in the case where the access fails. In the case of failure the processing logic may log an error message (e.g., to a console), provide an indication of the error to a user (e.g., via a GUI), and/or make a notation of the failure in database 109.

As one example, the processing logic may attempt to send a network ping to VM hosting server 103 over the management logical network and check for a response, the processing logic may attempt to access a file system of VM hosting server 103 over the management logical network (e.g., via FTP or HTTP) and check for successful access, the processing logic may attempt to access a console of VM hosting server 103 over the management logical network (e.g., via telnet, SSH, or HTTP) and check for successful access, and/or the processing logic attempt to access over the management logical network (e.g., via interprocess communication) host agent 150 and/or other functionality of VM hosting server 103 and check for successful access. Such a check for a response or for successful access might, for instance, fail where the management logical network is not present. Such a check for a response or for successful access might, for instance, fail where the management logical network appears to be present, but nevertheless a response is not received or access is not successful. Such a circumstance might arise, for example, where the management logical network is present but malformed.

The processing logic may, for instance, await a reboot of VM hosting server 103 before so attempting to access VM hosting server 103 and/or host agent 150 over the management logical network. The processing logic may, for instance, not await such a reboot (e.g., the processing logic might attempt access without concern of whether or not there has been a reboot of VM hosting server 103).

As one example, the processing logic may send a reboot command to VM hosting server 103 and/or host agent 150 thereof (e.g., via interprocess communication and/or via a power management interface). As another example, the VM hosting server might cause itself to reboot without having received instruction to do so from the processing logic. For instance, the VM hosting server might (e.g., via action of host agent 150) reboot in response to the processing logic configuring the management logical network for the VM hosting server (e.g., in response to a corresponding interprocess communication and/or a corresponding script provision).

The processing logic may, for instance, subsequent to configuring the management logical network for VM hosting server 103 (e.g., subsequent to the interprocess communication or scripts send) act so that networking changes to VM hosting server 103 providing it access to the management logical network persist after a reboot of VM hosting server 103. Such might be performed in a fashion along the lines of that which is discussed hereinabove (e.g., via interprocess communication and/or scripts provision). The processing logic may, for instance, not so act to have the networking changes persist after a reboot of VM hosting server 103 (e.g., the changes might persist without the call for an explicit request by the processing logic).

As discussed hereinabove, the processing logic may act to instantiate networking changes with respect to VM hosting server 103 (e.g., relating to NIC association with a management logical network VLAN, bridge establishment, VLAN ID change, and/or VLAN type change). As one example, the networking changes may be implemented by way of the processing logic sending a remote networking setup command to host agent 150. The command might be sent via interprocess communication. As another example, the networking changes may be implemented by way of the processing logic sending one or more scripts to be executed by host agent 150. Either or both of the remote networking setup command or the script provision may involve host agent 150 instantiating the desired functionality via networking capabilities provided by an operating system of VM hosting sever 103.

As another example, the networking changes may be implemented by way of the processing logic, directly and/or in a fashion not employing host agent 150, instantiating the desired functionality via networking capabilities provided by an operating system of VM hosting sever 103. For instance, the processing logic might in instantiating the networking changes directly access (e.g., by way of interprocess communication), the networking capabilities provided by an operation system of VM hosting server 103.

Figure 4:
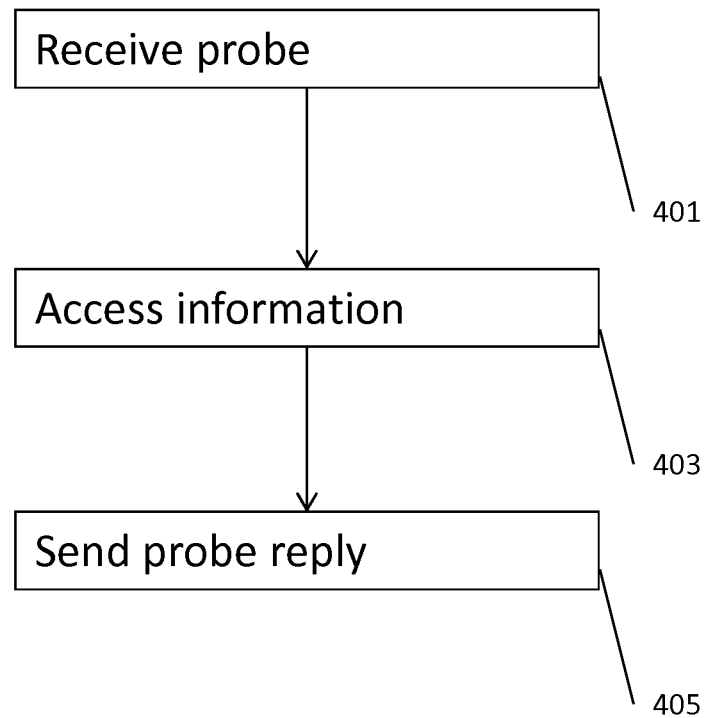
FIG. 4 is a flow diagram illustrating a method of probe reply formulation, according to an example.

FIG. 4 illustrates a flow diagram of one example of a method of probe reply formulation. The method may be performed by processing logic that comprises hardware (e.g., circuitry, dedicated logic, programmable logic, microcode, etc.), software (such as instructions run on a processing device), or a combination thereof. As one example, the method may be performed by a host agent running on a computing device. For instance, the method may be performed by host agent 150 running on VM hosting server 103.

At block 401, the processing logic may receive (e.g., via interprocess communication) a probe (e.g., a probe sent by host controller 107 and/or by manager 114). The probe might, for instance, be in accordance with that which is discussed hereinabove with respect to block 303. At block 403 the processing logic may access networking configuration information (e.g., regarding VM hosting server 103) and/or information regarding the management logical network which is to be configured. Such access may involve accessing a data store (e.g., of VM hosting server 103) and/or accessing networking configuration data (e.g., via interaction with networking functionality provided by an operating system such as an operating system of VM hosting server 103).

At block 405 the processing logic may send (e.g., via interprocess communication) a probe reply. The processing logic may send the probe reply to the sender of the probe (e.g., to host controller 107 and/or to manager 114). The probe reply may include the accessed information (e.g., the networking configuration information and/or the information regarding the management logical network which is to be configured).

It is noted that although at various junctures herein discussion is, to facilitate explanation, with respect to a single VM hosting server 103, according to various examples there may be multiple VM hosting servers. For instance, there may be multiple VM hosting servers accessible by host controller 107 and/or manager 114 via network 102, and/or one or more of the operations discussed in connection with FIG. 2, the operations discussed in connection with FIG. 3, and/or the operations discussed in connection with FIG. 4 may be performed by and/or with regard to one or more of such multiple VM hosting servers.

Figure 5:
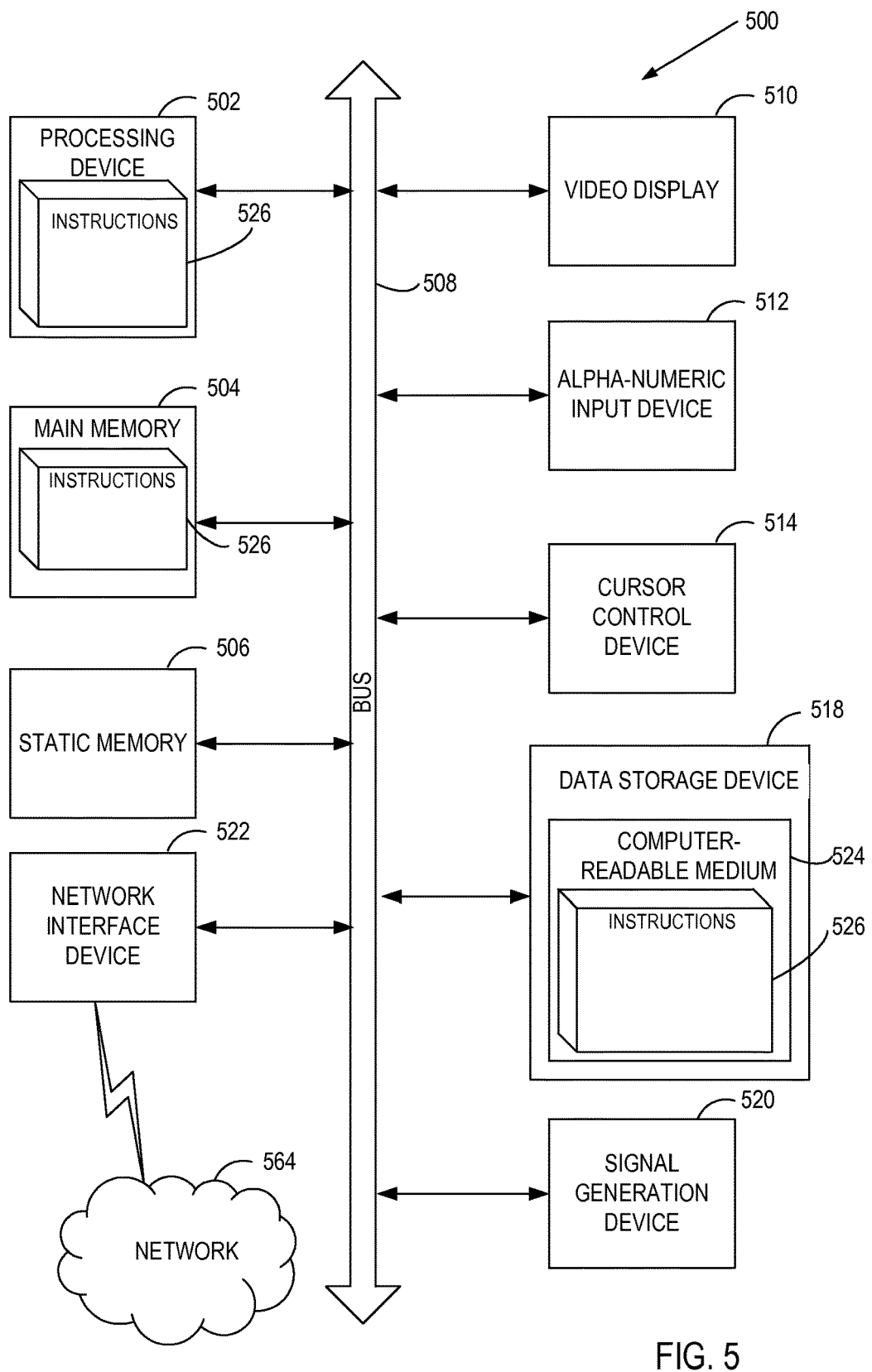
FIG. 5 is a diagrammatic representation of a machine, according to an example.

FIG. 5 illustrates a diagrammatic representation of a machine in the example form of a computing device 500 within which a set of instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 508.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 526) for performing the operations and steps discussed herein.

The computing device 500 may further include a network interface device 522. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504, within the static memory 506 and/or within the processing device 502 during execution thereof by the computer system 500, the main memory 504, static memory 506 and the processing device 502 also constituting computer-readable storage media.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   obtaining, by a processing device, a plurality of default properties of a management logical network;
   determining a plurality of network configuration properties of a virtual machine hosting server;
   determining one or more properties of the plurality of default properties of the management logical network to be instantiated on a virtual machine hosting server, wherein the management logical network compartmentalizes communications between the virtual machine hosting server and a host controller from other communications and wherein determining the one or more properties comprises comparing the plurality of default properties of the management logical network to the plurality of network configuration properties of the virtual machine hosting server to determine the one or more properties of the plurality of default properties of the management logical network that do not match the network configuration properties of the virtual machine hosting server;
   instantiating the determined one or more properties on the virtual machine hosting server, wherein instantiating the determined one or more properties on the virtual machine hosting server configures the virtual machine hosting server for access to the management logical network and wherein instantiating the determined one or more properties on the virtual machine hosting server comprises changing a first property of the determined one or more properties that did not match a first default property, to match the first default property; and
   verifying, by the processing device, that the host controller is able to access the virtual machine hosting server via the management logical network prior to determination of successful deployment.

2. The method of claim 1, further comprising determining whether or not the management logical network has, in agreement with the obtained properties, already been established.

3. The method of claim 1, wherein obtaining the plurality of default properties of the management logical network comprises one or more of receiving a probe reply or accessing a database.

4. The method of claim 1, wherein the determined one or more properties of the default properties of the management logical network comprise one or more of:
   one of bridged or non-bridged;
   or maximum transmission unit size.

5. The method of claim 1, further comprising deploying the virtual machine hosting server.

6. The method of claim 1, further comprising providing instructions to configure the virtual machine hosting server for access to the management logical network according to default properties.

7. An apparatus, comprising:
   a memory; and
   a processing device communicably coupled to the memory, the processing device to:
      obtain a plurality of default properties of a management logical network;
      determine a plurality of network configuration properties of a virtual machine hosting server;
      determine one or more properties of the plurality of default properties of the management logical network to be instantiated on a virtual machine hosting server, wherein the management logical network compartmentalizes communications between the virtual machine hosting server and a host controller from other communications and wherein to determine the one or more properties, the processing device is to compare the plurality of default properties of the management logical network to the plurality of network configuration properties of the virtual machine hosing server to determine the one or more properties of the plurality of default properties of the management logical network that do not match the network configuration properties of the virtual machine hosting server;
      instantiate the determined one or more properties on the virtual machine hosting server, wherein instantiating the determined one or more properties on the virtual machine hosting server configures the virtual machine hosting server for access to the management logical network and wherein instantiating the determined one or more properties on the virtual machine hosting server comprises changing a first property of the determined one or more properties that did not match a first default property, to match the first default property; and verify that the host controller is able to access the virtual machine hosting server via the management logical network prior to determination of successful deployment.

8. The apparatus of claim 7, wherein the processing device further to determine whether or not the management logical network has, in agreement with the obtained properties, already been established.

9. The apparatus of claim 7, wherein to obtain the default properties of the management logical network, the processing device is to at least one of receive a probe reply or access a database.

10. The apparatus of claim 7, wherein the determined one or more properties of the default properties of the management logical network comprise at least one of:
one of bridged or non-bridged; or
maximum transmission unit size.

11. The apparatus of claim 7, wherein the processing device further to perform virtual machine hosting server deployment.

12. The apparatus of claim 7, wherein the processing device further to provide instruction to configure the virtual machine hosting server for access to the management logical network according to default properties.

13. A non-transitory machine-readable storage medium storing instructions which, when executed, cause a processing device to:
obtain a plurality of management logical network properties;
determine a plurality of network configuration properties of a virtual machine hosting server;
determine one or more properties of the plurality of management logical network properties to be instantiated on a virtual machine hosting server, wherein the management logical network compartmentalizes communications between the virtual machine hosting server and a host controller from other communications and wherein to determine the one or more properties, the processing device is to compare the plurality of management logical network properties to the plurality of network configuration properties of the virtual machine hosing server to determine the one or more properties of the plurality of management logical network properties that do not match the network configuration properties of the virtual machine hosting server;

instantiate the determined one or more properties on the virtual machine hosting server, wherein instantiating the determined one or more properties on the virtual machine hosting server configures the virtual machine hosting server for access to a management logical network and wherein instantiating the determined one or more properties on the virtual machine hosting server comprises changing a first property of the determined one or more properties that did not match a first default property, to match the first default property; and verify, by the processing device, that the host controller is able to access the virtual machine hosting server via the management logical network prior to determination of successful deployment.

14. The non-transitory machine-readable storage medium of claim 13, wherein the processing device is further to determine whether or not the management logical network has, in agreement with the obtained properties, already been established.

15. The non-transitory machine-readable storage medium of claim 13, wherein to obtain the plurality of management logical network properties, the processing device is to either receive a probe reply or access a database.

16. The non-transitory machine-readable storage medium of claim 13, wherein the determined one or more properties of the management logical network properties comprise at least one of:
one of bridged or non-bridged; or
maximum transmission unit size.

17. The non-transitory machine-readable storage medium of claim of claim 13, wherein the processing device is further to perform virtual machine hosting server deployment.

* * * * *